US011286988B2

(12) United States Patent
Roffe et al.

(10) Patent No.: US 11,286,988 B2
(45) Date of Patent: Mar. 29, 2022

(54) SINGLE-PIECE HIGH-SPEED BEARING CAGE

(71) Applicant: Schaeffler Technologies AG & Co. KG, Herzogenaurach (DE)

(72) Inventors: Dennis Roffe, Fort Mill, SC (US); Guihui Zhong, Charlotte, NC (US); Michael Heaton, Rock Hill, SC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 16/939,184

(22) Filed: Jul. 27, 2020

(65) Prior Publication Data

US 2022/0025929 A1     Jan. 27, 2022

(51) Int. Cl.
*F16C 33/41*    (2006.01)
*F16C 19/16*    (2006.01)

(52) U.S. Cl.
CPC ............ *F16C 33/414* (2013.01); *F16C 19/16* (2013.01)

(58) Field of Classification Search
CPC .......... F16C 33/3837; F16C 33/3856; F16C 33/3806; F16C 33/3843; F16C 33/385; F16C 33/4605; F16C 33/41–418; F16C 33/49; F16C 33/491; F16C 33/494–498; F16C 19/16
See application file for complete search history.

(56) References Cited

U.S. PATENT DOCUMENTS

| | | | | |
|---|---|---|---|---|
| 1,697,064 A * | 1/1929 | Hughes | ............. | F16C 33/425 384/532 |
| 1,715,114 A * | 5/1929 | Beardsley | ............. | F16C 19/364 384/580 |
| 2,977,164 A * | 3/1961 | Witte | ............. | F16C 33/4652 384/576 |
| 3,606,504 A * | 9/1971 | Wojciechowski | ...... | F16C 19/40 384/551 |
| 5,069,560 A * | 12/1991 | Niedermeier | ....... | F16C 33/7893 384/486 |
| 5,074,679 A * | 12/1991 | McLarty | ............. | F16C 33/416 384/526 |
| 5,131,762 A | 7/1992 | Waskiewicz | | |
| 5,597,243 A * | 1/1997 | Kaiser | ............. | F16C 19/40 384/551 |
| 6,533,462 B2 * | 3/2003 | Kawakami | ............. | F16C 33/414 384/470 |
| 8,157,449 B2 * | 4/2012 | Doyer | ............. | F16C 33/6614 384/531 |
| 8,454,240 B2 * | 6/2013 | Doyer | ............. | F16C 33/6614 384/470 |

(Continued)

FOREIGN PATENT DOCUMENTS

GB        2115889 A  *  9/1983  ............ B29C 45/26
KR     20150078455 A      7/2015

*Primary Examiner* — Alan B Waits

(57) ABSTRACT

A cage for a ball bearing is optimized for high-speed applications. To reduce weight, the cage is formed by a number of conical blades which collectively form an "X" shape. To add rigidity, a number of gussets are placed between the blades at various circumferential locations. The light weight reduces the centrifugal forces for a given diameter and rotational speed. The rigidity permits the cage to withstand the centrifugal forces without excessive deflection or stress.

7 Claims, 3 Drawing Sheets

(56) References Cited

U.S. PATENT DOCUMENTS

| | | | |
|---|---|---|---|
| 8,894,290 B2* | 11/2014 | Mola | F16C 33/3887 |
| | | | 384/523 |
| 2007/0053624 A1* | 3/2007 | Schoder | F16C 33/48 |
| | | | 384/494 |
| 2010/0142874 A1* | 6/2010 | Doyer | F16C 33/6614 |
| | | | 384/523 |
| 2016/0069389 A1* | 3/2016 | Bell | F16C 19/364 |
| | | | 384/573 |
| 2016/0160921 A1* | 6/2016 | Cisco | F16C 33/416 |
| | | | 384/531 |

* cited by examiner

SINGLE-PIECE HIGH-SPEED BEARING CAGE

TECHNICAL FIELD

The disclosure pertains to the general field of bearing cages. More particularly, the disclosure pertains to a single-piece bearing cage optimized for high-speed applications.

BACKGROUND

Bearings reduce friction between components with relative rotation by inserting rollers between the components which having rolling contact with the components as opposed to sliding contact. Cages may be used to position the rollers relative to one another circumferentially. Some cages are made from two pieces which are assembled to one another after the rollers are in position. Single piece cages are flexible enough to insert the rollers into roller pockets, but rigid enough to retain the rollers once inserted. In use, the cage rotates at approximately the average speed of the two components. At high speeds, centrifugal forces act on the cage, causing flexing.

SUMMARY

A bearing cage includes a plurality of conical blades and a plurality of radial gussets. The plurality of conical blades have cutouts defining a plurality of roller pockets. Each gusset of the plurality of radial gussets connects two blades of the plurality of conical blades at a respective circumferential location. The plurality of conical blades may include: i) a continuous outer conical blade extending radially outward and axially toward a closed side of the roller pockets, ii) a continuous inner conical blade extending radially inward and axially toward a closed side of the roller pockets, iii) a broken outer conical blade extending radially outward and axially toward an open side of the roller pockets, and iv) a broken inner conical blade extending radially inward and axially toward an open side of the roller pockets. The broken inner and outer conical blades include a plurality of segments separated by the roller pockets. The plurality of radial gussets may include: i) a plurality of outer gussets connecting the continuous outer conical blade to the broken outer conical blade, ii) a plurality of inner gussets connecting the continuous inner conical blade to the broken inner conical blade, and iii) a plurality of side gussets connecting the continuous outer conical blade to the continuous inner conical blade.

A bearing includes cage and a plurality of balls. The cage has a plurality of conical blades with cutouts defining a plurality of roller pockets in which the plurality of balls are retained. The cage has an inner surface and an outer surface. The inner surface has a first conical portion extending radially inward and toward a closed side of the pockets and a second conical portion extending radially inward and toward an open side of the pockets. The outer surface has a third conical portion extending radially outward and toward the closed side of the pockets and a fourth conical portion extending radially outward and toward the open side of the pockets. The cage may also include a plurality of inner gussets, each inner gusset connecting the first conical portion to the second conical portion. The cage may also include a plurality of outer gussets, each outer gusset connecting the third conical portion to the fourth conical portion. The cage may have a side surface including a fifth conical portion opposite first conical portion and a sixth conical portion opposite the third conical portion. A plurality of side gussets may connect the fifth conical portion to the sixth conical portion.

DETAILED DESCRIPTION

Embodiments of the present disclosure are described herein. It should be appreciated that like drawing numbers appearing in different drawing views identify identical, or functionally similar, structural elements. Also, it is to be understood that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The terminology used herein is for the purpose of describing particular aspects only, and is not intended to limit the scope of the present disclosure. Unless defined otherwise, all technical and scientific terms used herein have the same meaning as commonly understood to one of ordinary skill in the art to which this disclosure belongs. Although any methods, devices or materials similar or equivalent to those described herein can be used in the practice or testing of the disclosure, the following example methods, devices, and materials are now described.

Figure 1:
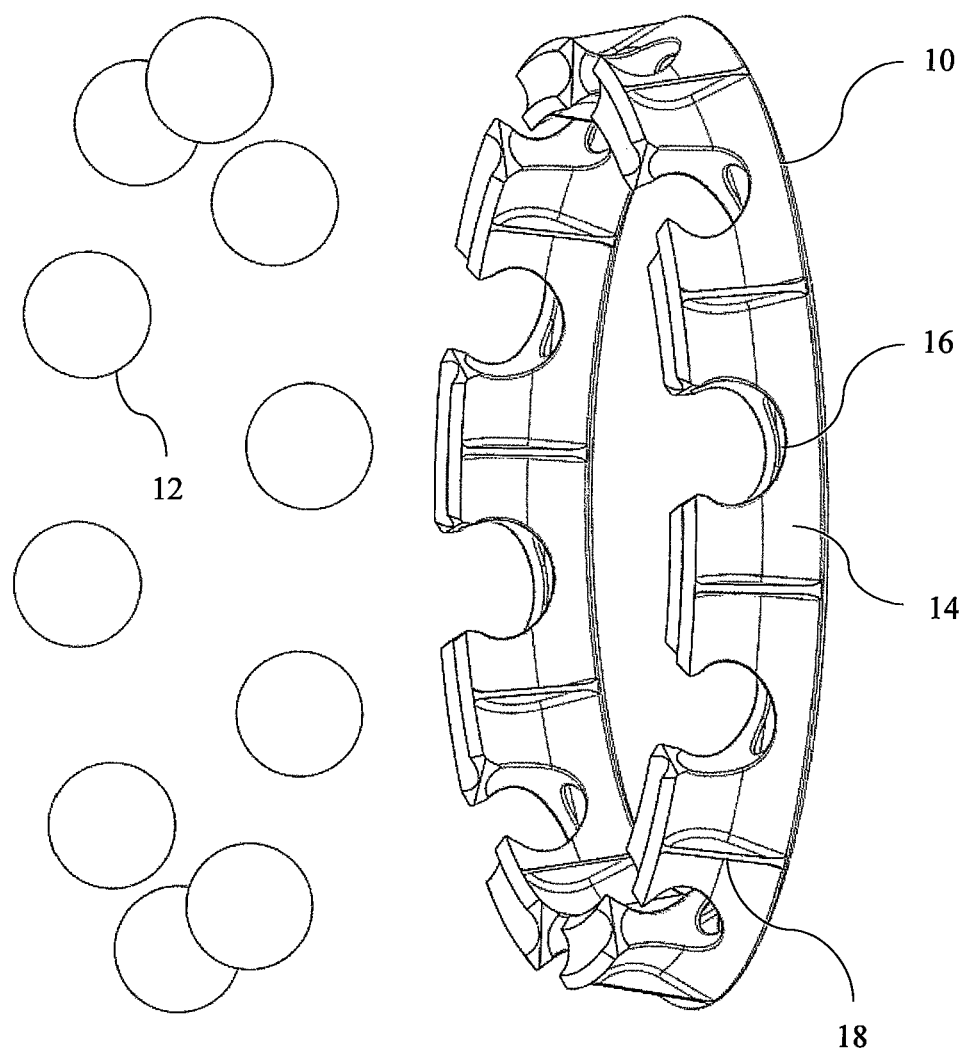
FIG. 1 is an exploded view of a bearing cage and a plurality of rollers.
Figure 2:
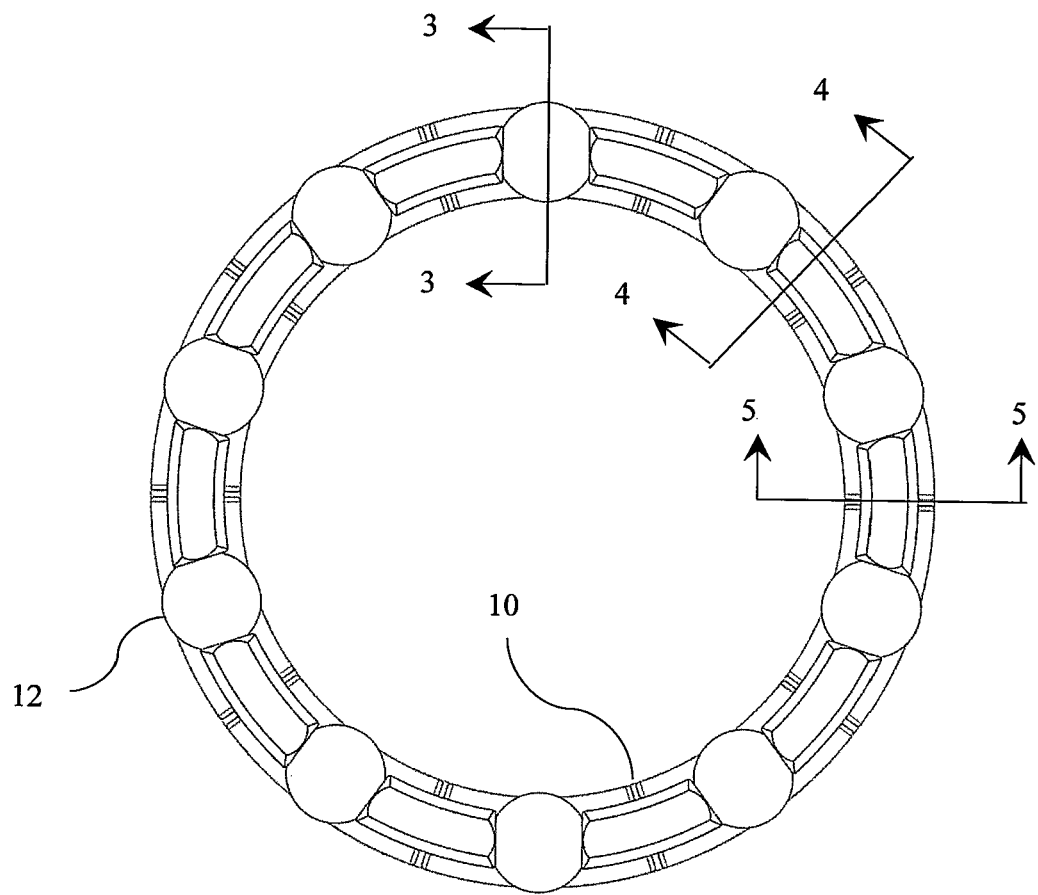
FIG. 2 is an end view of the cage of FIG. 1 with the rollers of FIG. 1 installed.

FIG. 1 shows an exploded view of a high-speed single piece cage 10 and ball rollers 12. The cage includes a number of conical blades 14. A number of roller pockets 16 are defined in the blades 14. Between roller pockets, a number of radial gussets 18 provide additional stiffness to the blades. FIG. 2 is a view along the axial axis of the cage 10 with the balls 12 installed.

Figure 3:
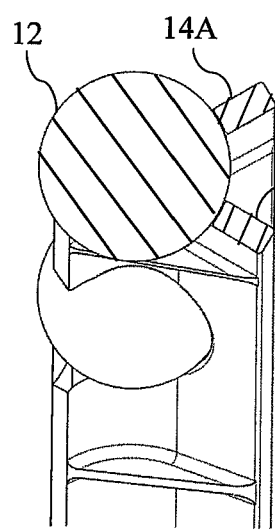
FIGS. 3, 4, and 5 are cross sections of the cage and roller assembly of FIG. 2 at different circumferential locations.
Figure 4:
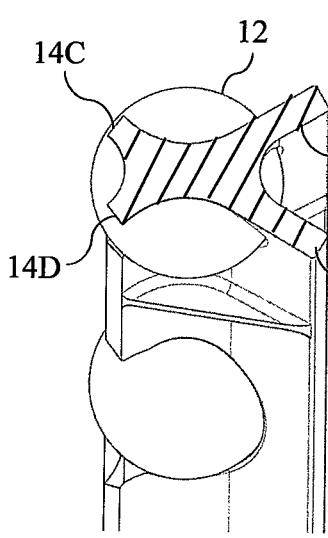
Figure 5:
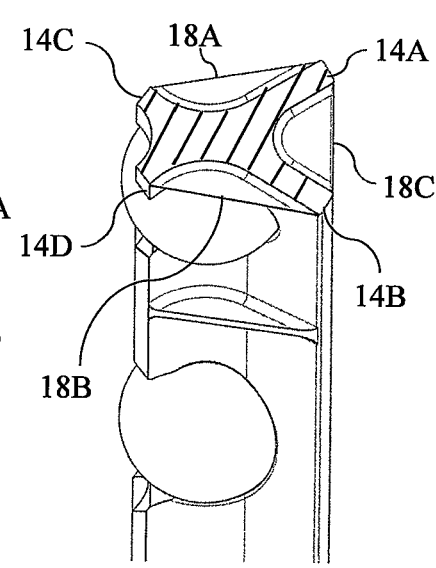

FIGS. 3-5 are cross section of the cage and ball assembly at different circumferential positions. FIG. 3 is a cross section through the middle of one of the balls. FIG. 4 is a cross section between one of the balls and an adjacent set of gussets. FIG. 5 is a cross section through a set of gussets.

Four conical blades 14A, 14B, 14C, and 14D extend from a central region, creating an "X" shaped cross section. Continuous outer conical blade 14A extends radially outward and axially toward the closed side of the cage. Continuous inner conical blade 14B extends radially inward and axially toward the closed side of the cage. Blades 14A and 14B are uninterrupted around the circumference of the cage, although they are thinner in the vicinity of the roller pockets. Broken outer conical blade 14C extends radially outward and axially toward the open side of the cage. Broken inner conical blade 14D extends radially inward and axially toward the open side of the cage. Blades 14C and 14D include a number of blade segments separated by the roller pockets.

Three separate sets of gussets are present, one gusset from each set being visible illustrated in FIG. 5. Outer gusset 18A connects continuous outer conical blade 14A to broken outer conical blade 14C. Inner gusset 18B connects continuous inner conical blade 14B to broken inner conical blade 14D. Side gusset 18C connects continuous outer conical blade 14A to continuous inner conical blade 14B.

Figure 6:
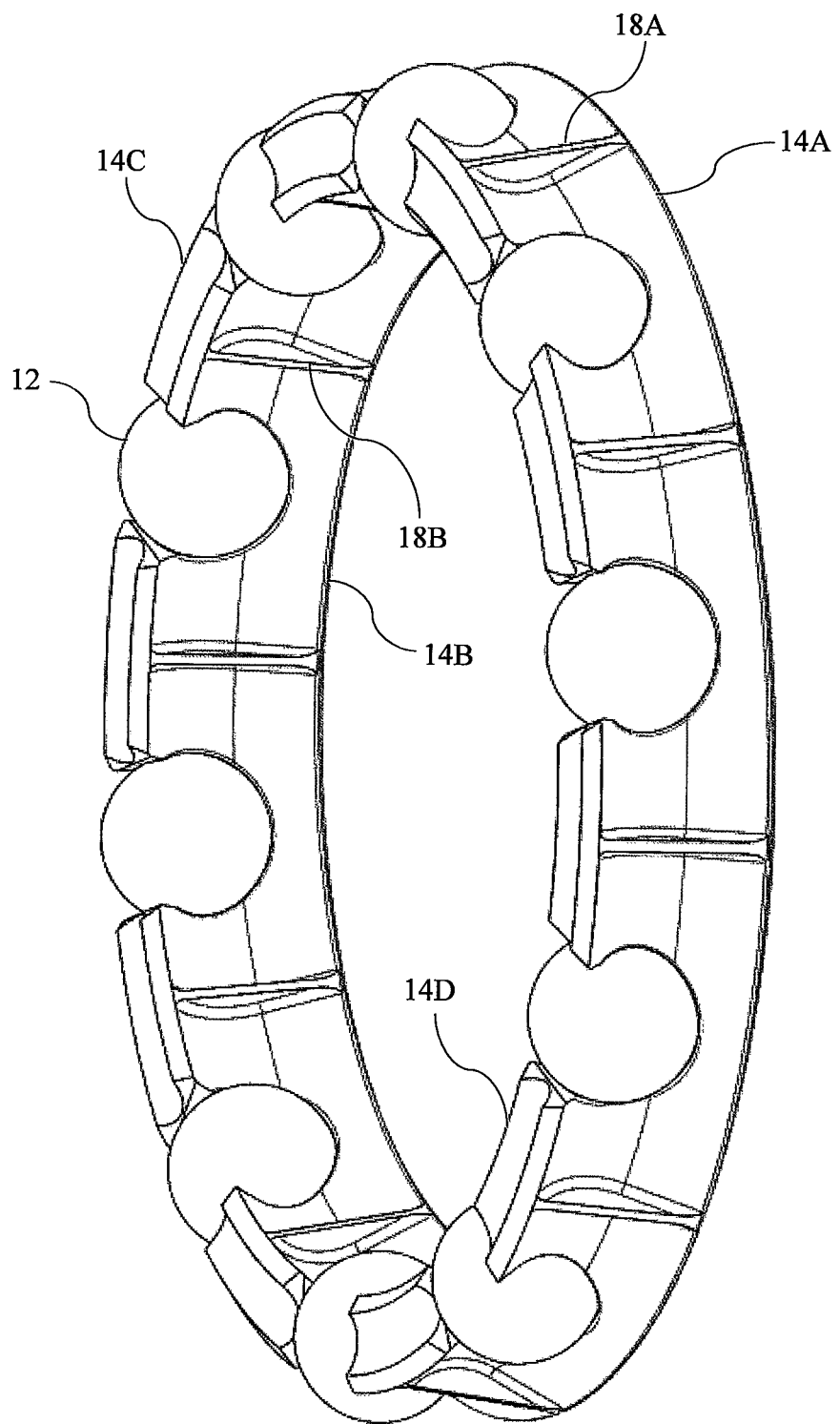
FIG. 6 is a pictorial view of the cage and rollers of FIG. 2.

FIG. 6 is a pictorial view of the cage and roller assembly. All four of the conical blades 14A, 14B, 14C, and 14D are visible in this view. Several of the outer gussets 18A an inner gussets 18B are visible in this view. The side gussets 18C are not visible.

The cage geometry produces a light weight, rigid cage. The light weight reduces the centrifugal forces for a given diameter and rotational speed. The rigidity permits the cage to withstand the centrifugal forces without excessive deflection or stress. Therefore, this design is suitable for high-speed applications.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, to the extent any embodiments are described as less desirable than other embodiments or prior art implementations with respect to one or more characteristics, these embodiments are not outside the scope of the disclosure and can be desirable for particular applications.

What is claimed is:

1. A bearing comprising:
   a cage having four conical webs extending from a central region to create an X-shaped cross section, the webs having cutouts defining a plurality of roller pockets; and
   a plurality of balls retained in the plurality of roller pockets;
   wherein the four conical webs includes:
   a continuous outer conical web extending from the central region radially outward and axially toward a closed side of the roller pockets;
   a continuous inner conical web extending from the central region radially inward and axially toward the closed side of the roller pockets;
   a non-continuous outer conical web extending from the central region radially outward and axially toward an open side of the roller pockets, the non-continuous outer conical web including a first plurality of segments separated by the roller pockets; and
   a non-continuous inner conical web extending from the central region radially inward and axially toward the open side of the roller pockets, the non-continuous inner conical web including a second plurality of segments separated by the roller pockets.

2. The bearing of claim 1 wherein the cage includes a plurality of outer gussets, each outer gusset connecting the continuous outer conical web to a segment of the first plurality of segments of the non-continuous outer conical web.

3. The bearing of claim 1 wherein the cage includes a plurality of inner gussets, each inner gusset connecting the continuous inner conical web to a segment of the second plurality of segments of the non-continuous inner conical web.

4. The bearing of claim 1 wherein the cage includes a plurality of side gussets connecting the continuous outer conical blade to the continuous inner conical blade.

5. A bearing comprising:
   a cage defining a plurality of roller pockets and having an inner surface and an outer surface, the inner surface having a first conical portion extending from a central region radially inward and toward a closed side of the pockets and a second conical portion extending from the central region radially inward and toward an open side of the pockets, the outer surface having a third conical portion extending from the central region radially outward and toward the closed side of the pockets and a fourth conical portion extending from the central region radially outward and toward the open side of the pockets; and
   a plurality of balls retained in the plurality of roller pockets.

6. The bearing of claim 5 wherein the cage further includes a plurality of inner gussets, each inner gusset connecting the first conical portion to the second conical portion.

7. The bearing of claim 5 wherein the cage further includes a plurality of outer gussets, each outer gusset connecting the third conical portion to the fourth conical portion.

* * * * *